March 8, 1955  J. S. SHAPIRO ET AL  2,703,624
JET DRIVEN AIRCRAFT SUSTAINING ROTOR BLADES
Filed July 25, 1947
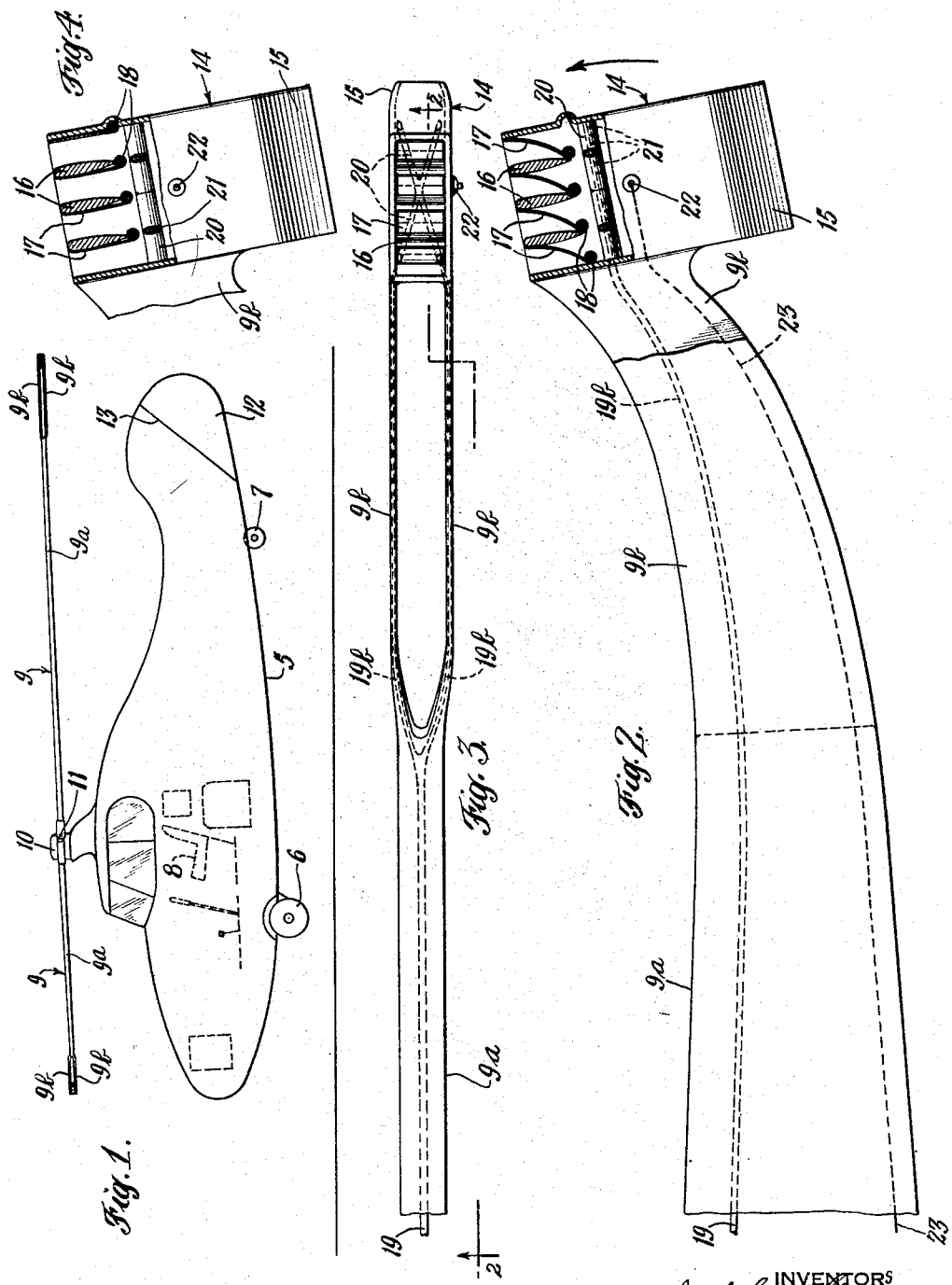
INVENTORS
Jacob Samuel Shapiro
Cyril George Pullin
BY
ATTORNEYS

United States Patent Office 2,703,624
Patented Mar. 8, 1955

2,703,624

JET DRIVEN AIRCRAFT SUSTAINING ROTOR BLADES

Jacob Samuel Shapiro, Hampstead, London, and Cyril George Pullin, Tadburn, Ampfield, England, assignors, by mesne assignments, to Autogiro Company of America, Philadelphia, Pa., a corporation of Delaware Application July 25, 1947, Serial No. 763,468

Claims priority, application Great Britain July 25, 1946

15 Claims. (Cl. 170—135.4)

This invention relates to sustaining rotor equipped aircraft, and is particularly concerned with jet driven aircraft sustaining rotor blades.

As is known the operation of jet reaction devices of various types increases in efficiency with increase in the speed of translation of the jet device through the air. In an aircraft sustaining rotor having jet driving devices mounted on the blades, increase in translational speed of the jet requires increase in rotational speed of the rotor; and when rotational speed of the rotor is extensively increased special problems arise as a result of the large increase in centrifugal force which also occurs, and as a result of shock stalling in the outer or tip portions of the rotor blades when the blade tip speed enters the high "subsonic" and the "transsonic" range. Still another problem which is encountered arises from the fact that a jet reaction device which is effective and efficient for use at very high speeds is very inefficient at low and intermediate speeds, as a result of which the high speed type of jet cannot effectively be employed to accelerate the rotor to the normal operating speed.

Stated generally, one of the primary objects of the invention is the provision of a jet driven aircraft sustaining rotor blade specially constructed to improve efficiency of operation from several standpoints, particularly at high rotational speeds. The invention also makes special provision for acceleration of the rotor to the high normal operating speed contemplated.

More specifically, the invention contemplates a rotor blade having toward its outer or tip region, a portion which is curved or swept away from the longitudinal axis of the inboard portion of the blade, for instance a sweepforward, whereby to retard or delay shock stalling at high subsonic and transsonic tip speeds.

According to another feature of the invention the jet driving device for the blade is carried thereby adjacent the blade tip and comprises a duct having an inlet opening presented forwardly and a discharge orifice presented rearwardly with respect to the rotational path of the jet device, the axis of the duct being inclined from a position of tangency, with the forward end of the axis inclined radially inwardly. Since the jet device is supplied with fuel delivered thereto intermediate the air inlet and the discharge orifice, the inclination of the duct axis serves to minimize the tendency of centrifugal force to concentrate the fuel particles against the radially outboard side of the duct.

According to still another feature, the blade of the present invention is bifurcated to provide a biplane tip portion, the jet device being connected with and carried by the tips of the planes of said biplane portion. Advantageously the point of bifurcation of the blade in the radial or spanwise direction lies in the region of junction between that portion of the blade (the outboard portion) which would be subject to shock stalling and the portion (inboard) not subject to shock stalling. Efficiency of the blade as a whole and especially of the tip portion thereof is thereby enhanced in a blade in which it is contemplated that the tip portion have an airspeed in the high subsonic or transsonic regions.

To further improve the efficiency of the high speed tip portion of the blade, the invention contemplates employing a biplane type of construction of small gap/chord ratio. For this same purpose, moreover, each plane of the biplane portion is of large chord/thickness ratio, the sides of the two planes of the biplane portion which are presented toward each other further being substantially flat and the other sides being cambered.

Still another object of the invention is the provision of a jet device incorporating a duct having an elongated cross-sectional shape, preferably oblong, the major axis of the cross-section lying substantially in the plane of the blade and the minor axis perpendicular thereto. With this construction it is contemplated that the dimension of the jet device transverse the plane of the blade should approximate the thickness of the blade. Thus, in the form of blade having a biplane tip portion, the dimension of the duct transversely of the blade approximates the overall thickness of said biplane portion.

In accordance with another aspect of the invention, the jet device is arranged for alternative operation either as an impulse or intermittent jet, or as a continuously operating or athodyd type of jet. It is contemplated that the jet device function as an impulse or intermittent jet for purposes of acceleration of the rotor and that at the normal operating speed the operation be converted to that of the athodyd type. This is of importance and advantage because of the fact that the athodyd type of operation is highly efficient at very high speeds but is not effective at low speeds or for the purpose of accelerating the rotor from a low speed to a high speed.

The invention further contemplates means automatically operative to convert the operation of the jet from the impulse type of operation to the athodyd type of operation, this automatic conversion taking place under the influence of the increase of centrifugal force which occurs upon acceleration of the rotor to a high speed.

How the foregoing and other objects and advantages are attained will appear more fully from the following description referring to the accompanying drawings, in which—

Figure 1 is a somewhat diagrammatic side outline view of an aircraft of the helicopter type having a single sustaining rotor incorporating a plurality of rotor blades constructed in accordance with the present invention;

Figure 2 is a bottom plan view to an enlarged scale of the tip portion of a rotor blade constructed according to the invention, this view being taken on the line 2—2 applied to Figure 3, and certain portions of the jet device being shown in section;

Figure 3 is a front elevational view of the portion of the blade illustrated in Figure 2; and Figure 4 is a view of the jet device similar to the showing thereof in Figure 2, but with certain parts of the jet device in different operating positions.

The aircraft shown in Figure 1 comprises a body or fuselage 5 having appropriate landing gear such as the wheels indicated at 6—7, and an occupant's compartment with a pilot's seat 8 therein. The rotor is mounted above the occupant's compartment and is preferably arranged for rotation substantially about a vertical axis passing close to the center of gravity of the aircraft.

The rotor may incorporate any desired number of blades 9, for instance three blades, the blades preferably being pivotally connected with a rotative hub 10, the pivotal connection for each blade including at least a flapping pivot 11 and, if desired, drag and/or pitch change pivots. Control of the aircraft in flight may be obtained by mounting the rotor as a whole for tilting movement, for instance in the manner disclosed in Cierva Patent No. 2,380,580, issued July 31, 1945. A rudder 12 mounted for movement on an inclined axis as indicated at 13 may also be employed for control purposes, the inclination of the rudder axis 13 enabling use of the rudder for directional control even in hovering flight, since the rudder is located below and thus within the influence of the downwash from the rotor.

Each rotor blade comprises a primary inboard portion 9a having substantially straight leading and trailing edges, although this portion of the blade may be tapered somewhat in plan, as clearly appears in Figure 2. At a point toward the blade tip, preferably outboard of 75% of the blade radius, for instance at about 80–85% of the blade radius, the blade is forked to provide a biplane portion incorporating upper and lower parts 9b—9b. The parts 9b—9b are smoothly faired into the inboard portion 9a, as is clearly shown.

At the blade tip, the parts 9b—9b are connected with the jet driving device generally indicated at 14. The device 14 comprises a rectangular duct having its air inlet opening forwardly and its discharge orifice opening rearwardly with reference to the rotative path of the device. The discharge orifice may be tapered somewhat as indicated at 15; and in the inlet end the duct is provided with a series of fins 16 which divide the inlet end into a plurality of channels. Admission of air through each inlet channel is adapted to be controlled by a valve member 17, the several valve members being shown in closed position in Figure 2 and in open position in Figure 4. Each valve member 17 may comprise a spring plate which is connected and fixed at its leading edge to the leading edge of one of the fins 16 (or the outer side wall of the duct). The spring action of each valve member 17 normally tends to retain the valve member in its closed position as shown in Figure 2. Upon a large increase in centrifugal force, however, the valve members are retained in open position as shown in Figure 4. To ensure the desired opening of the valves, each member 17 is provided with a weight 18 at its free or trailing edge. Further characteristics of the valve member 17 are referred to herebelow.

The jet device is adapted to be supplied with fuel through the supply line 19 which is extended outwardly from the hub of the rotor through the inboard portion of the blade 9a which is branched as at 19b—19b, the branches being extended through the biplane parts 9b—9b to the jet device. The branches 19b deliver fuel to the crossed discharge pipes 20 which are provided with a multiplicity of discharge orifices 21, so as to distribute the fuel over the cross-sectional area of the jet duct. An electric ignition device 22 is also provided in the jet duct, just to the rear of the zone of admission of the fuel. The ignition device may be supplied with operating current through the wire 23 which is extended radially inwardly through one of the parts 9b of the biplane portion of the blade and thence to the hub through the inboard part 9a.

It will be understood that the fuel supply line 19 and the wire 23 may be provided with appropriate flexible connections at the rotor hub through which these elements are appropriately connected with control and supply devices in the body of the aircraft. However, since these features form no part of the present invention per se they are not illustrated herein.

In operation, acceleration of the rotor is effected by the delivery of fuel to the jet device and the ignition thereof. At low and intermediate rotational speeds, the jet device will function as an intermittent or impulse jet. According to this type of operation, the jet repeatedly "fires," i. e., a rapid series of explosions occur. At this time, the valve members 17 operate in the manner of flutter valves, i. e., they rapidly open and close in response to the variations in pressure which occur in the duct as a result of the series of explosions which are taking place. Under the influence of the build up of pressure immediately following an explosion the valves 17 are closed and then upon appreciable drop in pressure in the duct the valves again open to admit additional air for the next succeeding explosion. The proportions of the jet duct and the characteristics of the spring or flutter valves 17 are arranged to provide a series of explosions following one upon another in rapid succession; and this impulse type of operation is highly effective in accelerating the rotor to the desired high normal operating speed. Upon attainment of the desired normal operating speed, the resultant increase in centrifugal force acts upon the valve members 17 and retains them constantly in open position, as indicated in Figure 4, whereupon the jet device functions continuously, i. e., as an athodyd type of jet.

With further reference to the arrangement of the blade, it will be noted that the jet duct is of rectangular cross-section, the thickness thereof being substantially equal to that of the blade, in view of which disturbance of the airflow over the blade tip and the jet, and therefore the drag, is reduced to a minimum. The plan pattern of the blade tip as shown in Figure 2, i. e., the sweep forward, and also the bifurcation of this tip portion are features of great importance in retarding or delaying shock stalling.

It is further noted that the axis of the jet duct is inclined from a position of tangency, with the leading end of the axis inclined radially inwardly. In view of this, the cross-sectional distribution of the fuel admitted to the duct is not adversely affected by the high centrifugal force acting on the fuel particles as they flow rearwardly from the discharge orifices 21.

Still further, the mounting of the jet device at the tip of the portion of the blade which is swept forwardly, results in location of the jet device in a position in which its maximum thickness is tangentially offset from the spanwise plane containing the axis of rotation and the maximum thickness of the blade. This is of advantage in reducing interference drag at high velocities and in minimizing disturbance of the radial flow components in the neighborhood of the blade tip and duct.

We claim:

1. For an aircraft having a bladed sustaining rotor, a rotor blade having a tip portion bifurcated to provide a biplane blade tip part in which each plane thereof has a substantially higher chord-to-thickness ratio than the chord-to-thickness ratio of the immediately adjacent unbifurcated blade portion inboard thereof.

2. A construction according to claim 1 wherein the plan pattern outline of the upper plane of the biplane part substantially directly overlies the plan pattern outline of the lower plane of the biplane part.

3. A construction accordinng to claim 1 wherein the gap dimension of the biplane part is not substantially greater than the blade thickness of the immediately adjacent unbifurcated blade portion inboard thereof.

4. A construction according to claim 1 in which, at normal rotor speed, the rotor rotates at a speed at which the blade tip attains a supersonic speed and in which the junction between the biplane tip part and the inner part of the blade is located radially of the blade in the region of transition between sonic and supersonic blade speeds.

5. For an aircraft having a bladed sustaining rotor, a rotor blade having a tip portion bifurcated to form a biplane part, each plane of the biplane part being substantially thinner than the blade part inboard of the bifurcation, and a jet driving device mounted at the tip of said biplane part, the tip portions of the two planes of the biplane part being interconnected and the jet device being connected thereto in the region of interconnection.

6. For an aircraft having a bladed sustaining rotor, a rotor blade having a tip portion bifurcated to form a biplane part, each plane of the biplane part being of high chord-to-thickness ratio, as compared with the chord-to-thickness ratio of the blade inboard of the bifurcation and a jet driving device mounted at the tip of said biplane part, and substantially bridging the interplane space of said biplane part.

7. A construction according to claim 5 and further including a fuel feed line for said jet device extended radially outwardly through the blade and being branched, with branches extended through the upper and lower planes of the biplane tip part of the blade.

8. For an aircraft having a bladed sustaining rotor, a rotor blade having a biplane tip portion and a jet driving device mounted thereon, each plane of the tip portion being of higher chord-to-thickness ratio than the chord-to-thickness ratio of the immediately adjacent monoplane portion of the blade inboard thereof, and the planes of said biplane portion having substantially flat surfaces presented toward each other.

9. A construction according to claim 8 in which the upper surface of the upper plane of the tip portion is cambered and in which the lower surface of the lower plane is cambered.

10. For an aircraft sustaining rotor, a rotor blade having jet driving device comprising a duct with one end presented forwardly and the other rearwardly of the rotative path thereof and having an air intake opening in its forward end, a flutter valve in said air intake opening displaceable into and out of the air inflow channel through said air inlet opening, responsive to variations in pressure in said duct and providing for impulse jet operation of the jet driving device, and means for holding the valve out of said channel, to provide for athodyd operation of the jet driving device.

11. For an aircraft sustaining rotor, a rotor blade having jet driving device comprising a duct with one end presented forwardly and the other rearwardly of the rotative path thereof and having an air intake opening in its forward end, a valve in said air intake opening movable between positions opening and closing the air intake opening for controlling the inflow of air, said valve being spring biased toward closed position, and a weight connected with the valve and movable radially outwardly under the action of centrifugal force acting to bias the valve toward its open position.

12. For an aircraft sustaining rotor, a rotor blade having a jet driving device comprising a duct with one end presented forwardly and the other end presented rearwardly with respect to the rotative path thereof, and a flutter valve in the entrance end of the duct comprising a mass-loaded plate-like member positioned within the duct so as to close the duct to the inflow of air from the forward end thereof and mounted for swinging movement within the duct in a direction outwardly from the blade root under the influence of centrifugal force so as to open the duct to the inflow of air from the forward end thereof when said plate-like member is moved outwardly by the centrifugal force of the rotating rotor blade.

13. For an aircraft sustaining rotor, a rotor blade having a jet driving device comprising a duct with one end presented forwardly and the other rearwardly of the rotative path thereof; and a valve assembly, including a valve member in the entrance end of the duct for regulating the inflow of air, the valve member being yieldingly biased towards closed position, means associated with said valve assembly to actuate the valve member including a valve actuating element movable by centrifugal force in a direction extending outwardly from the rotational axis, and a connection between the actuating element and the valve member providing for opening of the valve when the actuating element is moved outwardly.

14. A construction according to claim 13 in which said valve member is a flutter valve, in which the mass of the valve actuating element is small enough to permit valve member movement responsive to pressure variations in the duct below a predetermined rotational speed of the jet device to provide for impulse jet operation and in which the mass of the valve actuating element is sufficient to provide for maintaining the valve in open position under the action of centrifugal force at a rotational speed of the jet driving device above said predetermined rotational speed, to thereby provide for athodyd type operation of the jet driving device.

15. For a bladed aircraft sustaining rotor, a jet driving device rotative with the rotor and including a duct having an air inlet opening presented forwardly, and a valve in the air inlet opening for regulating the inflow of air, the valve comprising a plate-like spring member having one edge thereof fastened to the outer side wall of the air inlet opening, the spring member extending from said edge rearwardly in and across the inlet opening and having its trailing portion free to swing transversely of the air inlet opening to open and close the opening, the spring action of the spring member tending to maintain the air inlet opening closed, and the spring member being weighted to provide for movement thereof to open the air inlet opening under the influence of centrifugal force of rotation.

References Cited in the file of this patent

UNITED STATES PATENTS

| | | |
|---|---|---|
| 1,099,083 | Duc | June 2, 1914 |
| 1,133,660 | Papin et al. | Mar. 30, 1915 |
| 1,569,607 | Beck | Jan. 12, 1926 |
| 1,804,434 | Reed | May 12, 1931 |
| 1,850,452 | Fritz | Mar. 22, 1932 |
| 1,932,702 | Langdon | Oct. 31, 1933 |
| 2,142,601 | Bleecker | Jan. 3, 1939 |
| 2,149,951 | Baker | Mar. 7, 1939 |
| 2,299,592 | Rober | Oct. 20, 1942 |
| 2,344,266 | Reissner | Mar. 14, 1944 |
| 2,371,687 | Gerhardt | Mar. 20, 1945 |
| 2,397,357 | Kundig | Mar. 26, 1946 |
| 2,429,646 | Pullin | Oct. 28, 1947 |
| 2,446,266 | Cummings | Aug. 3, 1948 |
| 2,474,359 | Isacco | June 28, 1949 |
| 2,514,749 | Dobbins | July 11, 1950 |
| 2,553,253 | Hays | May 15, 1951 |

FOREIGN PATENTS

| | | |
|---|---|---|
| 11,668 | Great Britain | of 1898 |
| 227,151 | Great Britain | Jan. 12, 1925 |
| 409,379 | France | Feb. 17, 1910 |
| 423,590 | France | Apr. 21, 1910 |
| 648,107 | France | Aug. 7, 1928 |
| 843,334 | France | Mar. 27, 1939 |
| 877,989 | France | Sept. 21, 1942 |
| 905,544 | France | Apr. 23, 1945 |